(12) United States Patent
Lahtinen et al.

(10) Patent No.: US 6,946,502 B1
(45) Date of Patent: Sep. 20, 2005

(54) PAINT COMPOSITIONS

(75) Inventors: Maarit Lahtinen, Jyväskylä (FI); Kari Rissanen, Hankasalmi (FI); Salme Koskimies, Helsinki (FI); Karri Airola, Porvoo (FI); Robert Jansson, Helsinki (FI)

(73) Assignee: Dynea Chemicals Oy, Porvoo (FI)

( * ) Notice: Subject to any disclaimer, the term of this patent is extended or adjusted under 35 U.S.C. 154(b) by 0 days.

(21) Appl. No.: 09/889,496

(22) PCT Filed: Jan. 18, 2000

(86) PCT No.: PCT/FI00/00039

§ 371 (c)(1),
(2), (4) Date: Aug. 13, 2001

(87) PCT Pub. No.: WO00/44836

PCT Pub. Date: Aug. 3, 2000

(30) Foreign Application Priority Data

Jan. 18, 1999 (FI) ................................................. 990089

(51) Int. Cl.$^7$ ............................. C08K 3/20; C08L 31/02
(52) U.S. Cl. ..................... 523/412; 523/402; 523/411; 523/413
(58) Field of Search ................................. 523/402, 411, 523/412, 413

(56) References Cited

U.S. PATENT DOCUMENTS

| | | |
|---|---|---|
| 4,522,962 A | 6/1985 | Abbey et al. |
| 4,816,500 A | 3/1989 | Corcoran |
| 5,017,435 A | 5/1991 | Barsotti et al. |
| 5,356,714 A | 10/1994 | Fritsche et al. |
| 6,008,273 A * | 12/1999 | Leibelt et al. ............... 523/409 |

FOREIGN PATENT DOCUMENTS

| | | |
|---|---|---|
| EP | 10069326 | 1/1983 |
| EP | 2781797 | 7/1997 |
| GB | 953761 | 4/1964 |
| JP | 53011926 | 2/1978 |
| JP | 10324842 | 12/1998 |
| WO | 19744335 | 11/1997 |

* cited by examiner

Primary Examiner—James J. Seidlsak
Assistant Examiner—U. K. Rajguru
(74) Attorney, Agent, or Firm—Birch, Stewart, Kolasch & Birch, LLP

(57) ABSTRACT

The present invention concerns a paint composition which comprises a binder, a coalescent agent and optionally admixtures and auxiliary agents known per se. The film forming agent comprises a glycidyl ether or glycidyl ester or a mixture thereof, the hydrocarbyl residue of the alcohol or carboxylic acid, respectively, of the ether or ester comprising a linear or branched, saturated or unsaturated hydrocarbon having 3 to 20 carbon atoms. The invention further concerns a method of accelerating the hardening of paint compositions and a novel method of preparing glycidyl esters. The film forming agents used in the invention lower the film forming temperature better than conventional reactive film forming agents. Due to low volatility the compounds are suitable for no-VOC applications.

19 Claims, 1 Drawing Sheet

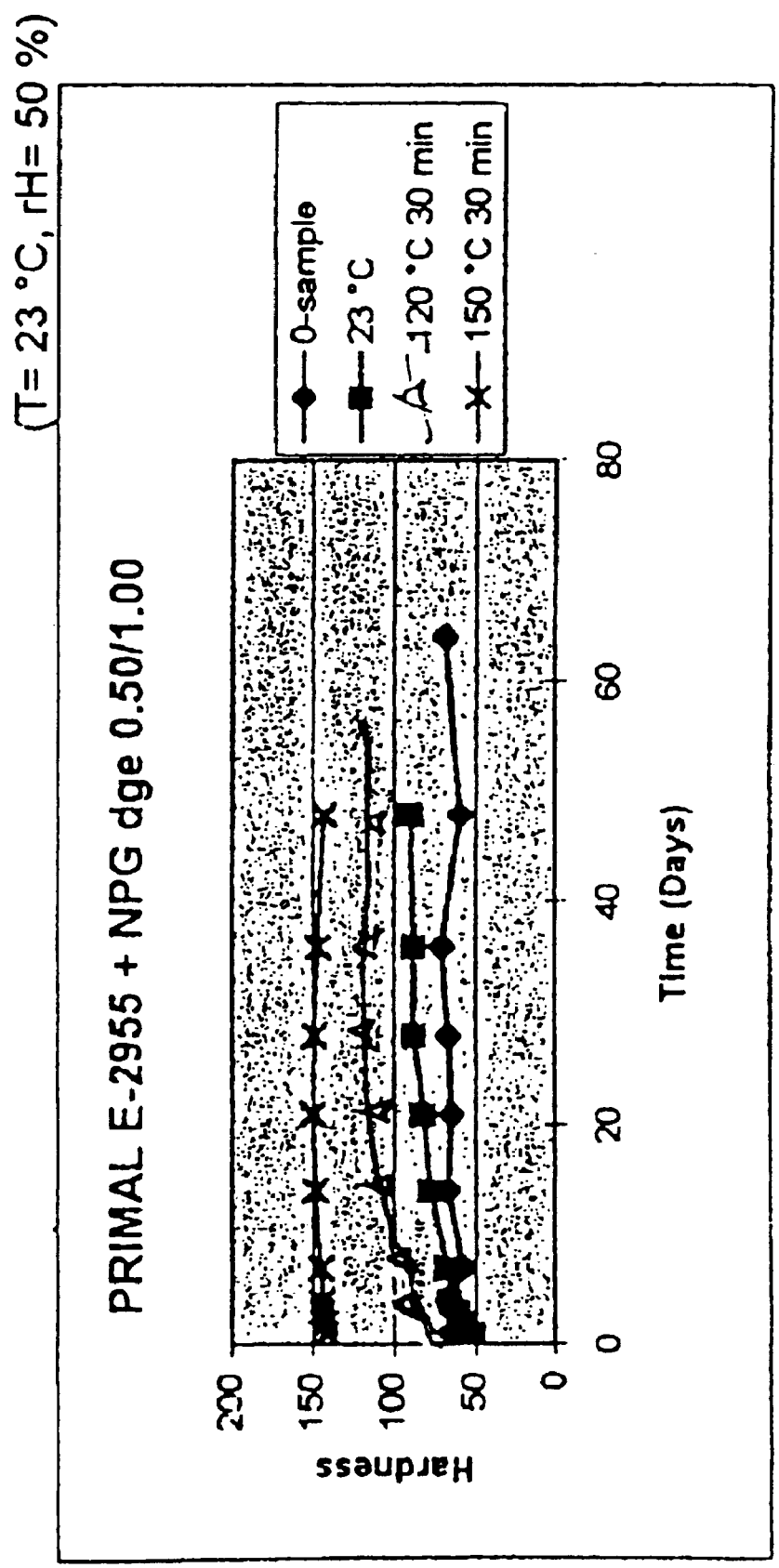

PAINT COMPOSITIONS

This application is the national phase under 35 U.S.C. § 371 of PCT International Application No. PCT/FI00/00039 which has an international filing date of Jan. 18, 2000, which designated the United States of America and was published in English.

The present invention concerns a paint composition according to the preamble of claim 1. Generally, a composition of this kind contains a binder, a coalescent agent and admixtures and auxiliary agents known per se.

The invention further relates to a method according to the preamble of claim 14 for accelerating the hardening of a paint composition and to the use according to claim 16.

Many emulsion polymers used in latex paints do not form a film at moderate or low temperatures. In order to enable film formation at these conditions, film forming agents (coalescent agents) are added to latex paints. In solvent-borne paints the solvents provide for a lowering of the film formation temperature. The film forming chemicals are often organic solvents which evaporate into the surrounding air when the paint dries and hardens, thus giving rise to a smell and pollution problem. The traditional film forming agents therefore also increase the amounts of the volatile components (VOC) and the total emissions of the paint.

It is an aim of the development of coalescent agents to introduce on the market substituting coalescent agents which do not belong to the group of volatile organic compounds (VOC components). The disadvantage of non-volatile or slowly evaporating components is, however, their plasticising property, which gives rise to slow development of paint film hardness and which may leave the film in a soft condition.

Various reactive coalescent agents can be used in paint mixtures which should be kept free from emissions detrimental to the environment. These compounds should react with and form a part of the paint film, whereby the emissions minimized. The aim of using reactive coalescent agents is both to improve the development of the hardness and to reduce the film formation temperature. These compounds are exemplified by, e.g., different isocyanates and epoxides and siloxanes.

Due to their structure the capability of reactive compounds of reducing the film formation temperature is often very small in comparison to normal volatile or so called no-VOC coalescent agents. Furthermore, isocyantes are sensitive to moisture and cannot be used in aqueous dispersions. In order to reach the film formation temperatures required for paints, conventional coalescent agents have to be used in addition to the reactive compounds.

It is an aim of the present invention to eliminate the disadvantages of the prior art and to provide entirely novel paint compositions.

The use of glycidyl esters in solvent borne paints is know per se. Thus, published international patent application WO 97/44335 discloses that glycidyl esters can be used as reactive diluents for the preparation of epoxy, urethane and polyester paints. There is no mention in the publication about other properties of the glycidyl esters, e.g. their capability of forming films.

The present invention is based on the finding that glycidyl derivatives containing a large-sized hydrocarbyl residue, in particular glycidyl ethers and glycidyl esters, have excellent film formation properties and good dispersability in water. According to the invention the coalescent agents of water-borne paint compositions therefore comprise an ether or ester formed by glycidol (2,3-epoxy-1-propanol) and an organic alcohol or carboxylic acid containing 3 to 20 carbon atoms. Surprisingly it has been found that it is possible partially or totally to replace present coalescent agents, in particular reactive coalescent agents, of paint compositions. They make it possible considerably to accelerate the hardening of the paint film.

Glycidyl esters, such as the glycidyl ester of 2-ethylhexanol, can be prepared at high yield and in great purity from the corresponding carboxylic acid by first forming the alkali metall salt of the carboxylic acid, by mixing said salt with a molar excess of epichlorohydrin and by maintaining the reaction mixture at a temperature of at least 60° C. under reflux conditions. The reaction can be continued at said temperature without the formation of significant amounts of by-products, until the yield of the glycidyl ester is at least 80%.

More specifically, the paint composition according to the present invention is characterized by what is stated in the characterizing part of claim 1.

The method of accelerating the hardening of a paint composition according to the present invention is characterized by what is stated in the characterizing part of claim 14, and the use according to the invention by what is stated in the characterzing part of claim 16.

The invention provides considerable advantages. Thus, the film forming agents according to the invention provide good dispersion of paint compositions which appears to be caused by the weakly polar ether bond or the more polar ester bond. Further, because of the rather large hydrocarbon group of the ether or ester, the novel coalescent agents reduce the film forming temperature better than conventionally used siloxanes or epoxy compounds. Due to the low volatility of the compounds they can be used in so called no-VOC applications. The reactive glycidyl group contained in the compounds makes it further possible to have the coalescent agents react so that they form a part of the paint film, whereby the total emissions are cut and there is an advantageous development of the hardness.

With the compounds it becomes possible to accelerate the hardening of the film so as to attain at least 70% of the final hardness already within a day. The present glycidyl ethers or esters can be used together with known film forming agents.

Next, the invention will be examined more closely with the aid of a detailed description and a number of working examples.

The attached drawing shows the development of König-pendulum hardness on glass sheets (t=23° C., rh=50%) of Primal E-2955+NPG diglycidyl ether at different temperatures and at a molar ratio between the epoxy and carboxylic acid groups of 0.5 to 1.0.

The present invention uses as a coalescent agent of paint compositions glycidyl ethers and/or esters which contain a linear or branched, saturated or unsaturated hydrocarbyl residue having a hydrocarbyl residue with 3 to 20 carbon atoms, usually 4 to 18 carbon atoms, preferably 4 to 12 carbon atoms, which is linked to the glycidyl group via an ether or ester bond. Short carbon chains give a more rapid development of the hardness and increase the final hardness of the film.

Thus, in the ethers used in the invention, at least one alcohol residue is derived from glycidol (2,3-epoxy-1-propanol), which forms an ether group with a linear or branched monoalcohol, diol, triol, tetraol or pentol having 3 to 20 carbon atoms.

The structure of the preferred glycidyl ethers is depicted in formula I

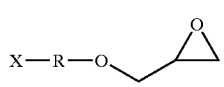

I wherein R is a linear or branched, usaturated or saturated $C_3$–$C_{20}$ hydrocarbon, optionally containing one or several hydroxyl groups, and X represents hydrogen or a hydroxyl group.

The ether derivatives may contain 1, 2, 3, 4 or 5 glycidyl ether groups. Glycidyl ether groups may also be contained in glycidyl esters which are derived from hydroxyacids. Glycidyl ester compounds derived from diols and polyols may also contain ether groups derived from other alcohols (mixed ethers). In particular, the alcohols of these other alcohols are alkanols, such as lower alkanols (methanol, ethanol, propanol, butanol). The ether groups derived from other alcohols, should such compounds be present, form at the most 80 mole-%, preferably 1 to 50 mole-% of the ether groups of the ether-based coalescent agent.

The other main group of the present coalescent agents is formed by esters which have an alcohol residue derived from glycidol and a carboxylic acid recidue derived from a linear or branched carboxylic acid comprising one or several protones (i.e. an acid which contains several carboxylic groups) and having 3 to 20, preferably 4 to 18, in particular 4 to 12 carbon atoms. The multibasic acids provide mono-, di-, tri- etc. esters. The esters can be semiesters or total esters.

The structure of preferred glycidylesters is depicted in formula II

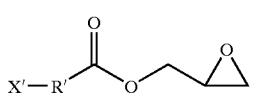

II wherein R' is a linear or branched, unsaturated or saturated $C_2$–$C_{20}$-hydrocarbon, which optionally contains one or several hydroxyl groups, and X' represents a methyl group, a methylene hydroxy group or a carboxy or lower carboxylate group.

Examples of the lower carboxylate groups are, in particular, methoxylate (—COOMe) and ethoxylate (—COOEt).

The esters can also be prepared from hydroxy acids, as mentioned above, whereby they may contain ether groups. The glycidyl esters of multibasic acids may contain in addition to the ester group derived from glycidol ester groups derived also from other alcohols (mixed esters). As mentioned above in connection with the ethers, these other alcohols are in particular alkanols, such as lower alkanols, e.g. methanol, ethanol, propanols or butanols.

Examples of ethers derived from monoalcohols include 2-ethylhexyl glycidyl ether and octyl glycidyl ether. Ethers derived from dialcohols are represented by mono- and diethers of neopentylglycol and as examples of triethers the triglycidyl ether of trimetanolpropan can be mentioned.

As examples of glycidyl esters, 2-ethylhexyl glycidyl ester, octyl glycidyl ester and isopentyl glycidyl ester and as examples of mixed esters the methyl glycidyl ester of gluratic acid can be mentioned.

The glycidyl ethers can be prepared by the Williamson ether synthesis starting from epichlorohydrin and alcohols. The preparation of glycidyl ethers has been described in an article by Kida, T., Yokota, M., Masuyama, A. ja Okahara, M., in Synthesis 1993, 487–489. Since the reaction between epichlorohydrin and a hydroxy group releases hydrogen chloride, the etherification is preferably carried out in an alkaline medium which is capable of binding the hydrogen chloride. In the examples below a medium containing potassium hydroxide has been used, whereby the hydrogen chloride forms potassium chloride, which can be separated from the reaction system by filtration. As a solvent of the organic phase in the reaction system, an organic solvent, such as toluene, DMSO or an ether, such as THF, can be used.

The etherification is preferably carried out at normal air pressure and at a temperature in the range of about 0 to 80° C. Preferably the reaction is carried out at a temperature above room temperature (at above 25° C.) and the temperature is raised after the addition of the reactant in order to increase the reaction rate. The product is recovered from the organic phase by extraction and distillation at reduced pressure.

An excess of epichlorohydrin is used in relation to the number of hydroxyl groups. The molar ratio between the epichlorohydrin and the hydroxyl groups of the alcohol is 10:1–1:1, preferably 5:1–2:1.

As far as the invention is concerned, suitable alcohols for the preparation of reactive alkoxides are the below listed monoalcohols and diols and triols. Suitable alcohols are branched or linear monoalcohols, diols and triols comprising generally 3 to 20 (in particular 4 to 18, preferably 4 to 12) carbon atoms. Particularly suitable alcohols for use as starting materials of glycidyl ethers employed in paint compositions are, e.g., 1-butanol, 2-butanol, isobutanol, 1-pentanol, isopentanol, 1-hexanol, 2-ethylhexanol, 1-heptanol, 1-octanol, 2-ethyl-1,3-hexanediol, neopentylglycol, 2-butyl-2-ethyl-1,3-propanediol, trimetylolethane and trimetylolipropane. Other suitable alcohols are 1,4-butanediol, neodecanealcohol, 1,6-hexanediol, 1,10-decanediol and 2-ethyl-2-hexen-1-ol.

The glycidyl esters according to the invention can be prepared from epichlorohydrin and acids and derivatives thereof e.g. by transesterification by reacting an alkali metal salt, e.g. a sodium salt, of a carboxylic acid with epichlorohydrin. For the dicarboxylic acid the starting materials can comprise, in addition to the acids, also the corresponding anhydride, from which a suitable alkali metal salt is formed. The preparation of of glycidyl esters from carboxylic acids is disclosed in an article by Kester, E. B., Gaiser, C. J. and Lazar, M. E., in J. Org. Chem., 8 (1943) 550 and the preparation of alkyl glycidyl esters of anhydrides in an article by Zlatanos, S. N. and Sagredos, A. N., in JAOCS, 67 (1990) 661.

The esters can also be prepared by direct esterification.

The temperature of the actual esterification reaction is 30 to 120° C., preferably about 50 to 100° C. The reaction is carried out at normal air pressure. A catalyst can be used during esterification in an amount of 1 to 40% of the amount of the esterification agent. Suitable esterification catalysts are p-toluenesulphonic acid, benzenesulphone acid, sulphuric acid, tin and zinc salts or oxides and titanates. Suitable transesterification catalysts are alkali metal alkoxides, such as potassium or sodium alkoxides, sulphuric acid, hydrochloric acid and acid ion exchange resins.

According to a preferred embodiment the esterification is carried out by first forming an alkali metal salt from a linear or branched, unsaturated or saturated carboxylic acid having 3 to 20 carbon atoms. A reaction mixture is then formed from the alkali metal salt of the carboxylic acid and a molar excess of epichorohydrin which is refluxed at a temperature of at least 60° C. Since the reaction mixture contains several components, the reaction temperature can vary, depending on the conditions of the refluxing, even with 20 to 50 degrees. A typical temparature range during the reaction is about 65 to 100° C. The reaction is continued after this for at least 1 hour at said temperature until the yield of the glycidyl ester is at least 80%, typically at least 90%. The formation of the by-products is less than 5% of the end product, and the purity of the product is over 95%. During the reaction the excess of epichlorohydrin amounts to at least 50%, typically the molar ratio of epichlorohydrin to the number of carboxy groups of the reacting carboxylic acid is 2- to 5-fold. Surprisingly it has been found that the glycidyl ester of, e.g. 2-ethylhexanoic acid, can be produced at rather high yield, typically amounting to over 90% and at high purity (purity in excess of 95%).

Acids suitable for esterification comprise generally branched or linear mono- or dicarboxylic acids and hydroxy acids having 4 to 18 carbon atoms. Particularly suitable acids as starting compounds of glycidyl esters used in paint compositions are, e.g., butanoic acid, isobutanoic acid, pentanoic acid, isopentanoic acid, 1-hexanoic acid, 2-ethylhexanoic acid, heptanoic acid, octanoic acid, neodecanoic acid, 2-hydroxy-isobutanoic acid, 2,2-dimethyl-3-bydroxypropanoic acid, adipinic acid, fumaric acid and maleic acid, succinic acid, glutaric acid and anhydrides and other derivatives thereof and 2-ethyl-2-hexenoic acid, oleic acid and linoleic acid.

The glycidyl ethers and glycidyl esters according to the invention can be formulated into water-borne dispersions, which contain a water-dispersable binder and admixtures and auxiliary agents known per se. The binding agents may comprise binders of latex paints, such as poly(vinyl acetate) and polyacrylates. Generally the polyacrylates comprise a synthetic latex, which is an ethylenically unsaturated polymer or copolymer, such as acrylic acid, itaconic acid or maleic acid. The poly(vinyl acetate) may include comonomers having carboxylic groups. Other binders which can be dispersed into water include various water-soluble polymers (e.g. PVA), starch, CMC, hydroxyethyl cellulose and poly (vinyl alcohol).

In addition to the above mentioned binding agents various water-dispersable alkyds may be used. These generally comprise a condensate product formed from a bivalent polyol and fatty acid or a natural oil. To facilitate dispersion or even dissolution in water they typically contain carboxylic acid groups.

It is particularly preferred to use the glycidyl ethers and/or esters according to the invention in paint compositions which contains a binder which forms a hard film when the paint has dried. Suitable binders are, e.g. acrylate latexes, wherein styrene is polymerised with one or several acrylate or methacrylate monomers. Latexes of this kind are represented by styrene-acrylate-latexes having carboxy functions, such as styrene-methylmethacrylate or styrene-butylacrylate latexes. Example 11 below discloses the use of the coalescent agents according to the invention with styrene-ethylacrylate and styrene-2-ethylhexylacrylate-methylmethacrylate. Other suitable latexes which may be mentioned include styrene-2-ethylhexyl acrylate-vinylacetate and styrene-2-ethylhexylacrylate-methylmethacrylate-n-butylacrylate.

The amount of the binder is generally 20 to 80% of the dispersion. In mat ceiling and wall paints, as well as in water-borne anticorrosion paints, even smaller amounts can be used. Typically, in commercial latexes, the amount of the actual polymer is about 30 to 60%, in particular about 50%. Since paints may contain as little as only 10% latex, the amount of polymeric binder in mat paints is only about 5%. Thus, the paint compositions according to the present invention contain binder in an amount of 3 to 80%, in particular 4 to 60%.

The admixtures and auxiliary agents of the dispersions are exemplified by surfactants, dispersion agents, thickening agents, conservation agents/fungicides, antifoaming agents and fillers and pigments, such as calcium carbonate and titanium dioxide, and pH regulating agents, such as aqueous ammonia.

The amount of reactive coalescent agents according to the present invention in a dispersion is about 0.01–20 wt-%, preferably 0.1–15 wt-%. The coalescent agent may be constituted solely by the glycidyl ether, glycidyl ester or a mixture thereof or a mixture of ethers and/or esters and conventional coalescent agents. Generally the portion of glycidyl ethers or esters is at least 20 wt-%, typically over 50% of the total amount of coalescent agents. Preferably the present glycidyl derivatives are used together with coalescent agents or mixtures thereof having a boiling point higher than 250° C. at normal air pressure. Coalescent agents of this kind are, e.g. phenyl ethers of ethylene glycol, monoisobutyrate of 2,2,4-trimethyl-1,3-pentanediol monoisobutyraatti (supplied under the trade name Texanol), n-butylether acetate of diethyleneglycol and the mono-n-butyl ether of dipropyleneglycol and the mono-n-butylether of tripropylene glycol (supplied under the trade names Dowanol DpnB and Dowanol TPnB, respectively).

The present glycidyl derivatives are capable as such or in combination with known film forming agents considerably to accelerate hardness development of paint compositions. The final hardness is reached already within 7 to 14 days, whereby at least 70%, in particular at least 80% and usually at least 90% of the final film hardness is obtained within 24 hours when at least 20%, preferably at least 50%, of the film forming agent of the composition is formed by the glycidyl derivative.

As regards stability of the present reactive film forming agents and as far as the use of the paint compositions is concerned, the pH of the paint compositions is preferably neutral or acid, in particular neutral or slightly acidic. In particular the pH of the paint compositions is below about 8.5, preferably below 8.0.

The present film forming agents have been compared with commercial products. In paint compositions, the glycidyl compounds of Examples 4, 5 and 9 are capable of reducing the film forming temperature and in this respect they work better than the commercial compounds (Coatosil 1770) used for reference. Tables 1 and 2 will show that the boiling points of many of the prepared glycidyl compounds are in excess of 250 degrees and their volatilization rates are low, whereby their use is safer than of conventional reactive monomers, due to low volatility. The hardness of the paint films develops advantageously for every tested glycidyl compound. Examples 11 studies the development of the König Hardness of the Primal E-2955+NPG diglycidyl ether on a glass substrate at different temperatures at a molar ratio of the epoxy groups to the carboxy groups of 0.5 to 1.0. At all temperatures, the hardness developed better than that of the 0 samples.

The following non-limiting examples illustrate the invention.

EXAMPLE 1

Preparation of the Glycidyl Ether of 2-ethylhexanol 3 molar equivalents of epichlorohydrin are slowly added to a solution of 1 mol-eq. 2-ethylhexanol and 2 mol-eq of potassium hydroxide in DMSO. The mixture is heated during the addition of epichlorohydrin at about 35° C. and after the addition at 45° C. The formed KCl salt is filtered and the organic phase is extracted with ether. After drying, the product is distilled at reduced pressure. The purity of the product was 97% and the yield after distillation 50% of the theoretical yield.

EXAMPLE 2

Preparation of the Glycidyl Ether of 1-octanol 3 molar equivalents of epichlorohydrin are slowly added to a solution of 1 mol-eq. 1-octanol and 2 mol-eq. potassium hydroxide in DMSO. The mixture is heated during the addition of epichlorohydrin at about 35° C. and after the addition at 45° C. The formed KCl salt is filtered and the organic phase is extracted with ether. After drying the product is filtered at reduced pressure. The purity of the product was 100% and the yield after distillation was 32% of the theoretical yield.

EXAMPLE 3

Preparation of the Glycidyl Ether of Isobutanol 3 molar equivalents of epichlorohydrin are slowly added to a solution of 1 mol-eq. isobutanol and 2 mol-eq. potassium hydroxide in DMSO. The mixture is heated during the addition of epichlorohydrin at about 35° C. and after the addition at 45° C. The formed KCl salt is filtered and the organic phase is extracted with ether. After drying the product is filtered at reduced pressure. The purity of the product was 94% and the yield after distillation was 17% of the theoretical yield.

EXAMPLE 4

Preparation of the Diglycidyl Ether of Neopentylglycol 3 molar equivalents of epichlorohydrin are slowly added to a solution of 1 mol-eq. neopentyl alcohol and 2 mol-eq. potassium hydroxide in DMSO. The mixture is heated during the addition of epichlorohydrin at about 35° C. and after the addition at 45° C. The formed KCl salt is filtered and the organic phase is extracted with ether. After drying the product is filtered at reduced pressure. The purity of the product was 97% and the yield after distillation was 50% of the theoretical yield.

Table 1. Properties of the glycidyl ethers prepared in Examples 1 to 4

TABLE 1

Properties of the glycidyl ethers prepared in Examples 1 to 4

| Name | Bp (° C.) | volatilization rate (ButAc = 1) |
| --- | --- | --- |
| Example 1. 2-ethylhexyl glycidylether | 221 | 0.005110 |
| Example 2. octyl glycidylether | 255 | — |
| Example 3. isobutyl glycidylether | 168 | — |
| Example 4. neopentylglycol diglycidylether | 275 | 0.000387 |

EXAMPLE 5

Glycidylester of 2-ethylhexyl Acid

From 1 mol-eq. 2-ethylhexanoic acid and 2 mol-eq. NaOH in toluene the sodium salt of the acid was prepared. The water formed was removed with the aid of the toluene by azeotropic distillation. Then the reaction mixture is cooled to 50° C. and 3 mol-eq. epichlorohydrin are slowly added. After the addition of the epichlorohydrin the mixture was refluxed for 1–8 h at 65 to 100° C. The epichlorohydrin is removed by distillation and the product is distilled at reduced pressure. The yield of the product after the reaction was 94% and the purity of the distilled product was 98%.

EXAMPLE 6

Glycidylester of Octanoic Acid

From 1 mol-eq. octanoic acid and 2 mol-eq. NaOH in toluene the sodium salt of the acid was prepared. The water formed was removed with the aid of the toluene by azeotropic distillation. Then the reaction mixture is cooled to 50° C. and 3 mol-eq. epichlorohydrin are slowly added. After the addition of the epichlorohydrin the mixture was refluxed for 1–8 h at 65 to 100° C. The epichlorohydrin is removed by distillation and the product is distilled at reduced pressure. The yield of the product after the reaction was 24% and the purity of the distilled product was 90%.

EXAMPLE 7

Glycidylester of Isobutanoic Acid

From 1 mol-eq. isobutanoic acid and 2 mol-eq. NaOH in toluene the sodium salt of the acid was prepared. The water formed was removed with the aid of the toluene by azeotropic distillation. Then the reaction mixture is cooled to 50° C. and 3 mol-eq. epichlorohydrin are slowly added. After the addition of the epichlorohydrin the mixture was refluxed for 1–8 h at 65 to 100° C. The epichlorohydrin is removed by distillation and the product is distilled at reduced pressure. The yield of the product after the reaction was 65% and the purity of the distilled product was 100%.

EXAMPLE 8

Glycidylester of 2,2-dimethyl-3-hydroxypropanoic Acid

From 1 mol-eq. 2,2-dimethyl-3-hydroxypropanoic acid and 2 mol-eq. NaOH in toluene the sodium salt of the acid was prepared. The water formed was removed with the aid of the toluene by azeotropic distillation. Then the reaction mixture is cooled to 50° C. and 3 mol-eq. epichlorohydrin are slowly added. After the addition of the epichlorohydrin the mixture was refluxed for 1–8 h at 65 to 100° C. The epichlorohydrin is removed by distillation and the product is distilled at reduced pressure. The yield of the product after the reaction was 45% and the purity of the distilled product was 87%.

EXAMPLE 9

Methyl Glycidylester of Glutaric Acid 1 molar equivalent glutaric anhydride is added to a 1 N solution of NaOH in methanol/toluene. The mixture is cooled and the excess methanol is removed by distillation. The obtained sodium salt of the glutaric acid methyl ester is recrystallized from acetone and dried. 1 molar equivalent of the sodium salt of the glutaric acid and epichlorohydrin are mixed together and refluxed for 1 to 3 hours at 100 to 115° C. The catalyst may comprise tert-ethylammonium iodide in an amount of 0.02–0.1 molar equivalents of the sodium salt. The product mixture is cooled, filtered and the excess epichlorohydrin is removed by distillation. The cooled mixture is extracted with ether and distilled in vacuum. The yield of the product is 72% and the purity 89%.

viz, epoxysiloxane (Coatosil 1770) was used for reference. The impact of the various agents on the film forming temperature will appear from the attached table.

TABLE 3

The influence of the glycidyl compounds prepared in Examples 4, 5 and 9 on the film forming temperature of Joncryl-95 © and Primal E-2955 © latexes compared with that of a commercial reactive film forming agent (Coatosil 1770) (Joncryl 95 MFFT = 16° C., dry substance 30%, Primal E-2995 MFFT = 56° C.*, dry substance 37%)

|  | Joncryl-95 0% | Joncryl-95 3% | Joncryl-95 6% | Primal-2955 0% | Primal-2955 3% | Primal-2955 6% | Primal-2955 10% |
| --- | --- | --- | --- | --- | --- | --- | --- |
| Example 4. Diglycidylether of NPG | 16 | 14 | 0 | 40 | 36 | 24 | 15 |
| Example 5. Glycidylester of 2-EHA | 16 | 10 | 0 | 40 | 32 | 19 | 11 |
| Example 9. Meth. glycidylester of GA | 16 | 14 | 0 | 40 | 37 | 28 | 16 |
| Ref. sample: Coatosil 1770 | 16 | 14 | 10 | 40 | 39 | 33 | 29 |

*Value given by the manufacturer for the dry latex

EXAMPLE 10

Glycidylester of Isopentanoic Acid

From 1 mol-eq. isopentanoic acid and 2 mol-eq. NaOH in toluene the sodium salt of the acid was prepared. The water formed was removed with the aid of the toluene by azeotropic distillation. Then the reaction mixture is cooled to 50° C. and 3 mol eq. epichlorohydrin are slowly added. After the addition of the epichlorohydrin the mixture was refluxed for 1–8 h at 65 to 100° C. The epichlorohydrin is removed by distillation and the product is distilled at reduced pressure. The yield of the product after the reaction was 77% and the purity of the distilled product was 96%.

The boiling point of the isopentanoic acid glycidylester is 226 to 227° C.

TABLE 2

Properties of the glycidylesters of Examples 5 to 9

| Name | Bp (° C.) | volatilization rate (ButAc = 1) |
| --- | --- | --- |
| Example 5. 2-ethylhexyl glycidylester | 242–246 | 0.001984 |
| Example 6. Octyl glycidylester | 190 | — |
| Example 7. Isobutyl glycidylester | 69–71/0.1 mmHg | — |
| Example 8. 2,2,dimethyl-3-hydroxypropanoic acid glycidylester | — | — |
| Example 9. Glutaric acid methylglycidylester | 282–283 | 0.000067 |

EXAMPLE 11

Use of the Prepared Glycidyl Compounds as Film Forming Agents in Water-based Colour Compositions The applicability of some of the film forming agents prepared according to Examples 1 to 9 in colour compositions were tested by producing from two different commercial latex dispersion (Joncryl 95 and Primal E-2955) mixtures which contained glycidyl compounds admixed at different concentrations. A commercial film forming agent, The attached figure indicates how the König hardness of the Primal E-2955+NPG-dge sample has developed at different temperatures. As the figure shows, the hardness of a sample according to the invention is even up to three times as great as that of a 0 sample.

What is claimed is:

1. A water-borne paint composition which comprises a binder and a coalescent agent alone or together with at least one member of the group consisting of surfactants, dispersion agents, thickening agents, conservation agents/fungicides, antifoaming agents and fillers and pigments, calcium carbonate, titanium dioxide, pH regulating agents and aqueous ammonia, characterized in that at least 20% of the film forming agent is formed by a glycidyl ether of formula I

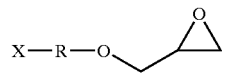

wherein R is a linear or branched, saturated or unsaturated $C_3$–$C_{20}$ hydrocarbon and X is hydrogen or a hydroxyl group, or a glycidyl ester of formula II

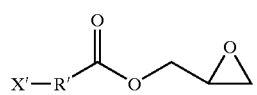

wherein R' is a linear or branched, saturated or unsaturated $C_2$–$C_{20}$ hydrocarbon and X' is a methyl group, a methylene hydroxy group or a carboxyl or lower carboxylate group, or a mixture thereof.

2. The paint composition according to claim 1, characterized in that it contains 0.01 to 20 wt.-% glycidyl ether or ester or admixture thereof based on the dry matter content of the composition.

3. The paint composition according to claim 1 or claim 2, characterized in that it contains 3 to 80 wt.-% of a binder which can be dispersed in water.

4. The paint composition according to claim 3, characterized in that the binder is poly(vinyl acetate), polyacrylate, poly(vinyl alcohol), starch, carboxymethylcellulose, hydroxyethyl cellulose or alkyd.

5. The paint composition according to claim 4, characterized in that the binder forms a hard polymer film when the composition has dried.

6. The paint composition according to claim 1, characterized in that the hydrocarbon residue of the glycidyl ether is derived from 1-butanol, 2-butanol, isobutanol, 1-pentanol, isopentanol, 1-hexanol, 2-ethylhexanol, 1-heptanol, 1-octanol, 2-ethyl-1,3-hexanediol, neopentyl glycol, 2-butyl-2-ethyl-1,3-propanediol, trimethylol ethane, trimetylol propane, 1,4-butanediol, neodecane alcohol, 1,6-hexanediol, 1,10-decanediol or 2-ethyl-2-hexen-1-ol.

7. The paint composition according to claim 1, characterized in that the carboxylic add residue of the glycidyl ester is derived from butanoic acid, isobutanoic acid, pentanoic acid, isopentanoic acid, 1-hexanoic acid, 2-ethylhexanoic acid, heptanoic acid, octanoic acid, neodecanoic acid, 2-hydroxy-isobutanoic acid, 2,2-dimethyl-3-hydroxypropanoic acid, 2-ethyl-2-hexenoic acid, oleic acid, linolic acid, adipic acid, fumaric acid, maleic acid, succinic acid, glutaric acid or an anhydride or another derivative thereof.

8. The paint composition according to claim 1, characterized in that the coalescent agent is 2-ethylhexylglycidyl ether, octyl glycidyl ether, mono- or diether of neopentylglycol or triglycidyl ether of trimetanolpropane, or 2-ethylhexyl glycidyl ester, octyl glycidyl ester or isopentyl glycidyl ester or methyl glycidyl ester of glutaric acid.

9. The paint composition according to claim 1, characterized in that its pH is below about 8.5.

10. The paint composition according to claim 1, characterized in that it contains in addition to the glycidyl ether or ester or admixture thereof, at least one other coalescent agent, the proportion of the glycidyl ether or ester or admixture thereof of the coalescent agents of the composition amounting to at least 20 wt.-%.

11. The paint composition according claim 10, characterized in that the other film forming agent is the phenyl ether of ethyleneglycol, 2,2,4-trimethyl-1,3-pentanediol monoisobutyrate or n-butyl ether acetate of diethyleneglycol.

12. A method of accelerating the hardening of an aqueous paint composition containing binder and coalescent agent alone or together with at least one member of the group consisting of surfactants, dispersion agents, thickening agents, conservation agents/fungicides, antifoaming agents and fillers and pigments, calcium carbonate, titanium dioxide, pH regulating agents and aqueous ammonia, characterized by incorporating into the composition a mono-glycidyl ether or ester or a mixture thereof, wherein the hydrocarbyl residue of the alcohol or carboxylic acid, respectively, of the ether or ester comprises a linear or branched, unsaturated or saturated hydrocarbon having 3 to 20 carbon atoms, the proportion of the glycidyl ether or ester or admixture thereof being at least 20 wt.-% of the film forming agents of the paint composition.

13. The method according to claim 12, characterized by incorporating at least 60 wt.-% of a glycidyl ether or ester or admixture thereof, whereby the paint composition attains at least 70% of its final hardness within a day.

14. A method for forming films in aqueous paint compositions comprising admixing a mono-glycidyl ether or ester or a mixture thereof with a latex dispersion, wherein said ether or ester contains a linear or branched, saturated or unsaturated hydrocarbyl residue comprising 3 to 20 hydrocarbyl residues with 3 to 20 carbon atoms which are linked to the glycidyl group via an ether or ester bond.

15. The paint composition according to claim 3, wherein said binder is 4 to 60 wt.-%.

16. The paint composition according to claim 1, wherein said $C_2$–$C_{20}$ hydrocarbon of said formula II contains one or several hydroxyl groups.

17. The paint composition according to claim 9, wherein said pH is below about 8.0.

18. The paint composition according to claim 1, wherein said $C_3$–$C_{20}$ hydrocarbon of said formula I contains one or several hydroxyl groups.

19. The paint composition according to claim 10, wherein said coalescent agents amount to at least 50 wt-%.

* * * * *